United States Patent
Fukushima

[11] Patent Number: 5,999,305
[45] Date of Patent: Dec. 7, 1999

[54] OPTICAL DEVICE WHICH MAKES USE OF MAGNETO-OPTICAL EFFECT

[75] Inventor: Nobuhiro Fukushima, Kawasaki, Japan

[73] Assignee: Fujitsu Limited, Kawasaki, Japan

[21] Appl. No.: 09/039,564

[22] Filed: Mar. 16, 1998

[30] Foreign Application Priority Data

Oct. 20, 1997 [JP] Japan ..................................... 9-286576

[51] Int. Cl.$^6$ ..................................................... G02F 1/09
[52] U.S. Cl. ........................... 359/284; 359/124; 359/127; 359/280; 359/281
[58] Field of Search ..................................... 359/280, 281, 359/282, 283, 284, 124, 127, 130

[56] References Cited

U.S. PATENT DOCUMENTS

| 5,812,710 | 9/1998 | Sugaya ....................................... 385/27 |
| 5,867,300 | 2/1999 | Onaka et al. ............................ 359/283 |

FOREIGN PATENT DOCUMENTS

| 55-126213 | 9/1980 | Japan . |
| 6-130339 | 5/1994 | Japan . |

*Primary Examiner*—Scott J. Sugarman
*Assistant Examiner*—Margaret Burke
*Attorney, Agent, or Firm*—Staas & Halsey LLP

[57] ABSTRACT

An optical device which can be used as a Faraday rotator which can provide an arbitrary Faraday rotation angle in accordance with a positional condition. The optical device includes first and second ports, magneto-optical crystal, and a unit for applying a magnetic field to the magneto-optical crystal. The first port is positioned in a first region while the second port is positioned in a second region. The first and second ports are optically coupled by a light beam. The magneto-optical crystal is provided such that the light beam may pass therethrough. The unit for applying applies a magnetic field to the magneto-optical crystal so that magnetization of the magneto-optical crystal may have a given distribution in a plane substantially perpendicular to the light beam. Since the magnetization of the magneto-optical crystal has the given distribution, whether the first port is at a certain position or at another position, the Faraday rotation angle provided to the light beam is different in accordance with the distribution. Accordingly, an arbitrary Faraday rotation angle can be provided in accordance with a positional condition.

25 Claims, 14 Drawing Sheets

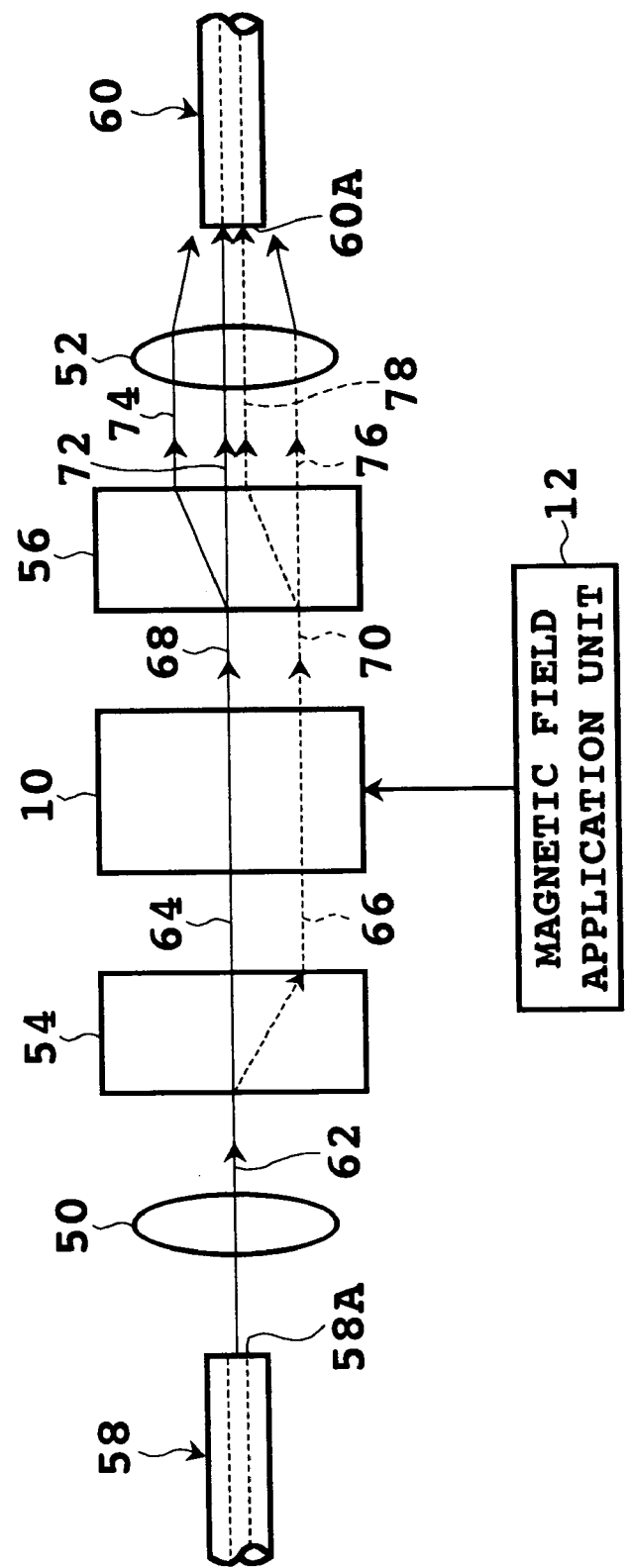

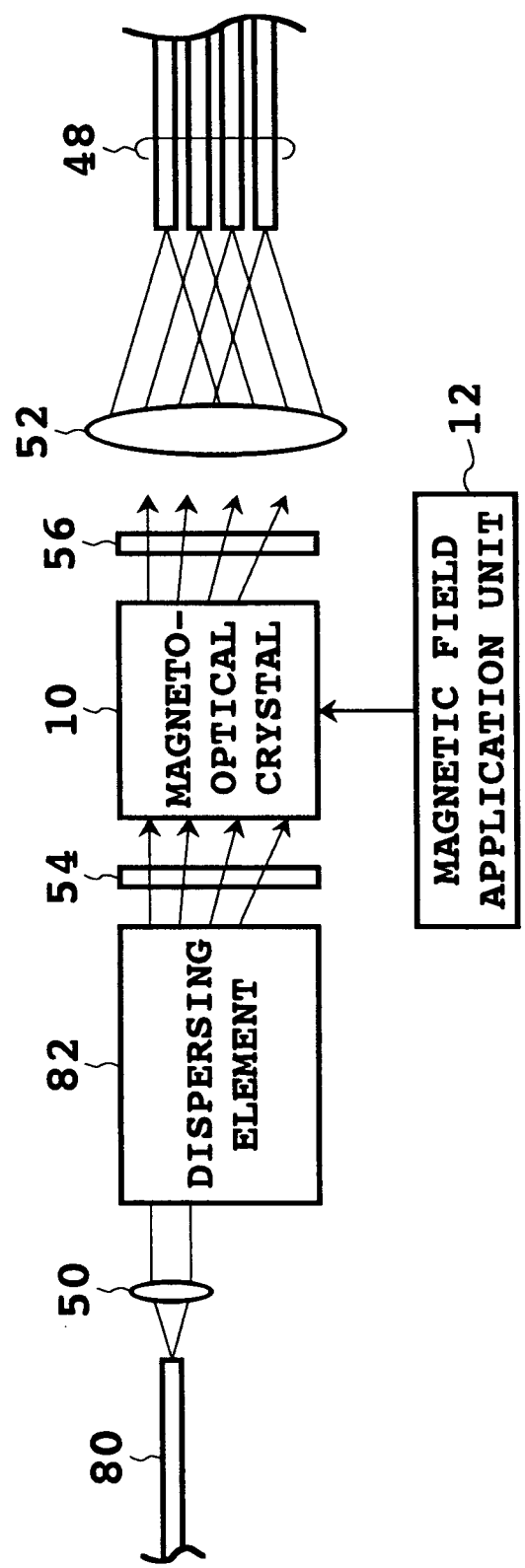

OPTICAL DEVICE WHICH MAKES USE OF MAGNETO-OPTICAL EFFECT

BACKGROUND OF THE INVENTION

1. Field of the Invention

This invention relates generally to an optical device which makes use of a magneto-optical effect, and more particularly to an optical device for providing an arbitrary Faraday rotation angle or an arbitrary attenuation to an optical signal of each channel in wavelength division multiplexing (WDM).

2. Description of the Related Art

When a light beam passes through magneto-optical crystal of YIG (yttrium-iron-garnet) or the like placed in a magnetic field, a Faraday rotation angle is provided to the light beam by a magneto-optical effect in accordance with the magnitude and the direction of a magnetization vector of the magneto-optical crystal and the thickness of the magneto-optical crystal. An optical device which operates in accordance with this principle is called Faraday rotator, and Faraday rotators wherein a magnetic field is applied to magneto-optical crystal using a permanent magnet have been put into practical use. Since magnetization of magneto-optical crystal by a permanent magnet is uniform, the Faraday rotation angle is usually invariable in the Faraday rotator.

A variable optical attenuator is provided by combination of a Faraday rotator and a polarizer. For example, Japanese Patent Laid-Open Application No. Heisei 1-204021 discloses a variable optical attenuator wherein a magnetic field is applied to magneto-optical crystal using only one electromagnet. However, where only one electromagnet is used, magnetization of the magneto-optical crystal may not always be in a saturated condition. If magnetization of magneto-optical crystal is not saturated, then a large number of magnetic domains appear in the magneto-optical crystal. The presence of such a large number of magnetic domains deteriorates the reproducibility of attenuation of an optical attenuator or, even if good reproducibility is secured, makes continuous variation of the attenuation difficult. Further, scattering of light at interfaces between a large number of magnetic domains causes attenuation which is difficult to control.

An optical device wherein an electromagnet and a permanent magnet are used in combination to allow variation of a Faraday rotation angle while magnetization of magneto-optical crystal is saturated has been proposed by the inventor of the present invention (Fukushima et al., OAA, FD9 pp.154–157, 1996). This optical device is a variable optical attenuator and achieves a characteristic of attenuation which continuously varies from 1.6 dB to 25 dB by varying the driving current from 0 mA to 40 mA.

In recent years, a technique of production and a technique of use of an optical fiber of a low loss (for example, 0.2 dB/km) have been established, and optical communication systems wherein an optical fiber is used as a transmission line have been put into practical use. Further, in order to compensate for the loss of an optical fiber to allow long-haul transmission, use of an optical amplifier for amplifying signal light has been proposed or such optical amplifiers have been put into practical use.

One of conventionally known optical amplifiers includes an optical amplification medium to which signal light to be amplified is supplied, and means for pumping the optical amplification medium so that the optical amplification medium may provide a gain band including the wavelength of the signal light. For example, an erbium-doped fiber amplifier (EDFA) includes an erbium-doped fiber (EDF) serving as an optical amplification medium, and a pump light source for supplying pump light having a wavelength determined in advance to the EDF. By setting the wavelength of the pump light to the 0.98 $\mu$m band or the 1.48 $\mu$m band, a gain band including a wavelength of 1.55 $\mu$m is obtained. Also another optical amplifier which includes a semiconductor chip as an optical amplification medium is known. In this instance, pumping takes place when current is injected to the semiconductor chip.

Meanwhile, as a technique for increasing the transmission capacity by a single optical fiber, wavelength division multiplexing (WDM) is available. In a system to which the WDM is applied, a plurality of optical carriers having different wavelengths from each other are used. A plurality of optical signals obtained by modulating the optical carriers independently of each other are wavelength division multiplexed by an optical multiplexer, and resulting WDM signal light is forwarded into an optical fiber transmission line. On the reception side, the WDM signal light received is demultiplexed into individual optical signals by an optical demultiplexer, and transmission data are reproduced based on the optical signals. Accordingly, by applying WDM, the transmission capacity of one optical fiber can be increased in accordance with the multiplexing number of optical signals.

Where an optical amplifier is incorporated in a system to which WDM is applied, the transmission distance is limited by a wavelength dependency of a gain represented by a gain tilt or a gain deviation. For example, with regard to an EDFA, it is known that a gain tilt appears in the proximity of the wavelength of 1.55 $\mu$m and this gain tilt varies in accordance with the input power of WDM signal light and the power of pump light to the EDFA, the temperature of the EDFA and so forth.

In order to suppress the wavelength dependency of the gain, it may be proposed to first attenuate optical signals of different channels using an optical attenuator having a suitable attenuation and then perform wavelength division multiplexing of the optical signals. In this instance, while an arbitrary attenuation can be provided to each of the optical signals of the channels by using a plurality of optical attenuators, a number of optical attenuators equal to the number of channels of WDM are required, and consequently, a complicated construction or a large size apparatus is required.

SUMMARY OF THE INVENTION

Accordingly, it is an object of the present invention to provide an optical device of a simple construction which can provide an arbitrary attenuation to an optical signal of each channel in wavelength division multiplexing (WDM).

It is another object of the present invention to provide an optical device of a simple construction which can provide an arbitrary Faraday rotation angle to an optical signal of each channel in wavelength division multiplexing.

The other objects of the present invention will become apparent from the following description.

According to an aspect of the present invention, there is provided an optical device which can be used as a Faraday rotator which can provide an arbitrary Faraday rotation angle in accordance with a positional condition. The optical device includes first and second ports, magneto-optical crystal, and means for applying a magnetic field to the magneto-optical crystal. The first port is positioned in a first region, and the second port is positioned in a second region. The first and second ports are optically coupled to each other by a light beam. The magneto-optical crystal is provided such that the light beam may pass therethrough. The means for applying applies a magnetic field to the magneto-optical crystal so that magnetization of the magneto-optical crystal may have a given distribution in a plane substantially perpendicular to the light beam.

When the first port is at a certain position in the first region, the first port is optically coupled to the second port which is at a corresponding position in the second region. When the first port is at another position in the first region, the first port is optically coupled to the second position which is at another corresponding position in the second region. Since magnetization of the magneto-optical crystal has the given distribution, whether the first port is at the certain position or at another position, the Faraday rotation angle provided to the light beam is different in accordance with the distribution. Accordingly, provision of an optical device as a Faraday rotator which can provide an arbitrary Faraday rotation angle in accordance with a positional condition is allowed.

For example, the first port is provided by a first plurality of optical fibers arranged in parallel to each other while the second port is provided by a second plurality of optical fibers arranged in parallel to each other. In this instance, each of the first plurality of optical fibers is optically coupled to a corresponding one of the second plurality of optical fibers. Then, different Faraday rotation angles are obtained which are different for individual light beams which couple corresponding pairs of ones of the optical fibers. Accordingly, by making each of the first plurality of optical fibers correspond to an optical signal of each channel in wavelength division multiplexing, an arbitrary Faraday rotation angle can be provided to the optical signal of each channel. Further, since it is required to use only one magneto-optical crystal member for a plurality of channels, the optical device is simplified in construction.

In operation of the optical device, a light beam which passes through the magneto-optical crystal is Faraday rotated by a rotation angle which is determined by the passing position and the distribution of magnetization of the magneto-optical crystal. Accordingly, the optical device functions as an optical attenuator by adding a polarizer which is provided such that the Faraday rotated light beam may pass therethrough.

Preferably, the means for applying a magnetic field to the magneto-optical crystal includes a plurality of magnets, and the plurality of magnets include at least one electromagnet for generating a variable magnetic field. According to the construction, by varying the magnetic field provided by the at least one electromagnet, the distribution of magnetization of the magneto-optical crystal can be set readily and arbitrarily.

Where the means for applying a magnetic field to the magneto-optical crystal includes means for varying the distribution of magnetization, when the first port is at a fixed position in the first region, the Faraday rotation angle provided by the light beam can be varied in accordance with the distribution of magnetization.

Preferably, the means for applying a magnetic field to the magneto-optical crystal includes means for saturating the strength of magnetization of the magneto-optical crystal, and means for providing a variation to the direction and the strength of the magnetization. In this instance, since the strength of magnetization of the magneto-optical crystal is saturated, it is prevented that a large number of magnetic domains are produced in the magneto-optical crystal, and consequently, the reproducibility of the Faraday rotation angle (or attenuation) is improved and continuous variation of the Faraday rotation angle (or attenuation) is allowed. Further, scattering of light at interfaces between a large number of magnetic domains is reduced and an increase of undesired attenuation is prevented. By providing a variation to the direction and the strength of magnetization in a condition wherein the strength of magnetization of the magneto-optical crystal is saturated, the distribution of magnetization of the magneto-optical crystal can be set arbitrarily.

Based on such a principle of operation of the optical device according to the present invention which can be used as a Faraday rotator, an optical device which can be used as an optical attenuator which can be applied to wavelength division multiplexing is provided.

According to another aspect of the present invention, there is provided an optical device as a first construction of an optical attenuator. The optical device comprises a first plurality of optical fibers positioned in a first region, a second plurality of optical fibers each optically coupled to a corresponding one of the first plurality of optical fibers by a light beam and positioned in a second region, magneto-optical crystal provided such that the light beams may pass therethrough, means for applying a magnetic field to the magneto-optical crystal so that magnetization of the magneto-optical crystal may have a given distribution in a plane substantially perpendicular to the light beam, first double refraction crystal interposed between the first plurality of optical fibers and the magneto-optical crystal for coupling the light beams to ordinary ray components and extraordinary ray components, and second double refraction crystal interposed between the magneto-optical crystal and the second plurality of optical fibers for coupling the ordinary ray components and the extraordinary ray components to the light beams.

According to a further aspect of the present invention, there is provided an optical device as a second construction of an optical attenuator. The optical device comprises a single optical fiber, a dispersing element for coupling the optical fiber to a plurality of light beams having different wavelengths from each other, a plurality of optical fibers to which the plurality of light beams are coupled, magneto-optical crystal provided such that the plurality of light beams may pass therethrough, means for applying a magnetic field to the magneto-optical crystal so that magnetization of the magneto-optical crystal may have a given distribution in a plane substantially perpendicular to the plurality of light beams, first double refraction crystal interposed between the dispersing element and the magneto-optical crystal for coupling the light beams to ordinary ray components and extraordinary ray components, and second double refraction crystal interposed between the magneto-optical crystal and the plurality of optical fibers for coupling the ordinary ray components and the extraordinary ray components to the light beams.

According to a still further aspect of the present invention, there is provided an optical device as a third construction of an optical attenuator. The optical device comprises a first optical fiber, a first dispersing element for coupling the first optical fiber to a plurality of light beams having different wavelength from each other, a second optical fiber, a second dispersing element for coupling the plurality of light beams to the second optical fiber, magneto-optical crystal provided such that the plurality of light beams may pass therethrough, means for applying a magnetic field to the magneto-optical crystal so that magnetization of the magneto-optical crystal may have a given distribution in a plane substantially perpendicular to the plurality of light beams, first double refraction crystal interposed between the first dispersing element and the magneto-optical crystal for coupling the light beams to ordinary ray components and extraordinary ray components, and second double refraction crystal interposed between the magneto-optical crystal and the second dispersing element for coupling the ordinary ray components and the extraordinary ray components to the light beams.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIG. 10 is a diagrammatic representation illustrating a principle of operation of the optical attenuator of FIG. 9;

FIG. 11 is a diagrammatic view showing a third embodiment of an optical attenuator according to the present invention;

DESCRIPTION OF THE PREFERRED EMBODIMENTS

In the following, preferred embodiments of the present invention are described in detail with reference to the accompanying drawings.

Figure 1:
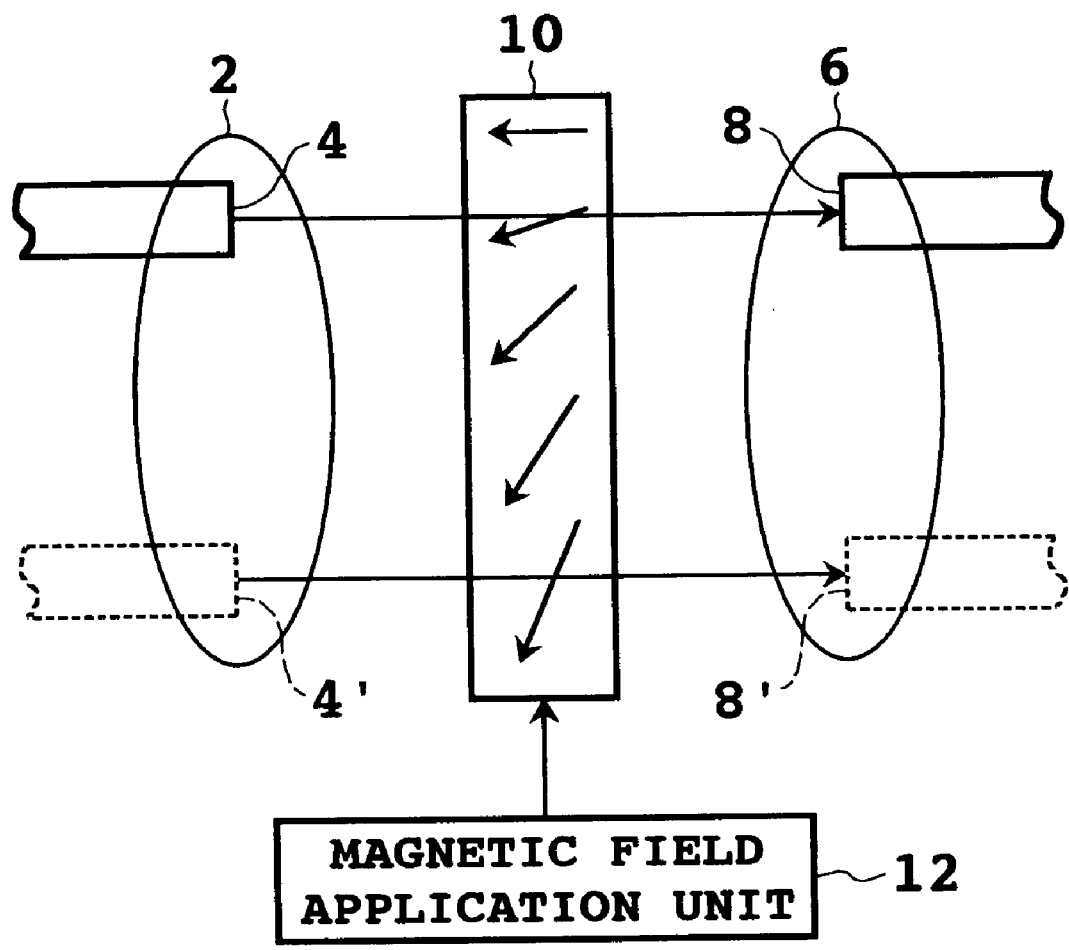
FIG. 1 is a block diagram showing an embodiment of a Faraday rotator according to the present invention.

FIG. 1 is a block diagram showing an embodiment of a Faraday rotator according to the present invention. The Faraday rotator shown includes a first port 4 positioned in a first region 2, a second port 8 positioned in a second region 6, magneto-optical crystal 10, and a magnetic field application unit 12. In the embodiment shown, each of the ports 4 and 8 is provided by an end of an optical fiber. Each port may alternatively be provided by a light emitting element or a light receiving element.

Here, a light beam outputted from the port 4 is Faraday rotated by the magneto-optical crystal 10, and the Faraday rotated light beam is inputted to the port 8. The magnetic field application unit 12 applies a magnetic field to the magneto-optical crystal 10 so that magnetization of the magneto-optical crystal 10 may have a distribution provided in a plane substantially perpendicular to the light beam. The first region 2 and the second region 6 are determined such that the light beam outputted from the port 4 to the port 8 may pass through the magneto-optical crystal 10.

In the embodiment shown, the distribution of magnetization provided to the magneto-optical crystal 10 by the magnetic field application unit 12 is such that the magnetization vector is gradually tilted with respect to the light beam from above to below in FIG. 1 in a plane substantially perpendicular to the light beam. According to such distribution of magnetization, when the light beam passes through an upper portion in FIG. 1 of the magneto-optical crystal 10, since the magnitude of a component of the magnetization vector which is parallel to the light beam is comparatively large, a comparatively large Faraday rotation angle is provided to the light beam. On the other hand, when the ports 4 and 8 are positioned at comparatively low positions in FIG. 1 as indicated by reference symbols 4' and 8', respectively, and the light beam passes through a lower portion of the magneto-optical crystal 10, since the magnitude of a component of the magnetization vector which is parallel to the light beam is comparatively small, the Faraday rotation angle provided to the light beam is smaller than that provided in the case described above.

In this manner, the Faraday rotator can provide an arbitrary Faraday rotation angle to a light beam which couples the ports 4 and 8 in accordance with the positional conditions of the ports 4 and 8 in the first region 2 and 6. Further, the magnetic field application unit 12 can vary the distribution of magnetization of the magneto-optical crystal 10 so that an arbitrary Faraday rotation angle may be provided to the light beam irrespective of the positions of the ports 4 and 8.

Figure 2A:
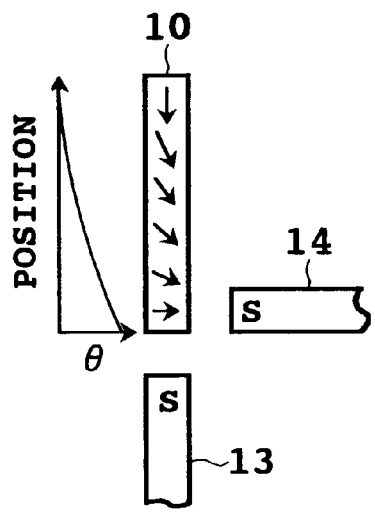
FIGS. 2A to 2C are schematic views showing embodiments of a magnetic field application unit which can be applied to the present invention.
Figure 2B:
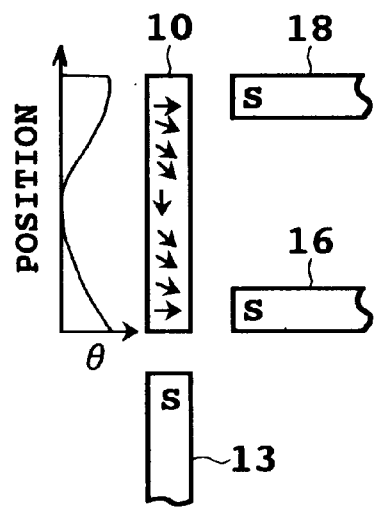
Figure 2C:
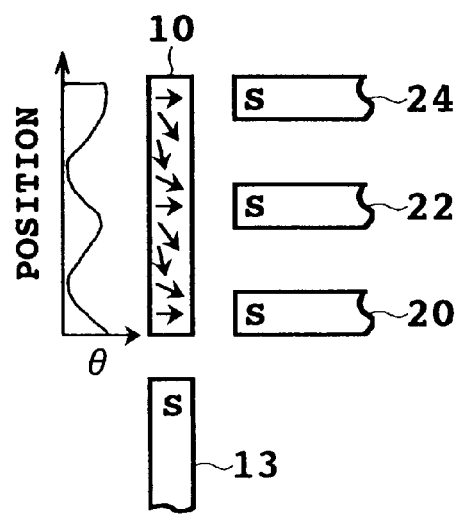

FIGS. 2A to 2C are views showing embodiments of the magnetic field application unit 12. It is assumed that, in each of FIGS. 2A to 2C, a light beam passes the magneto-optical crystal 10 in a direction from the left to the right or in the opposite direction from the right to the left.

In the embodiment shown in FIG. 2A, the magnetic field application unit 12 includes a magnet 13 for applying a magnetic field in an upward or downward direction in FIG. 2A to the magneto-optical crystal 10, and another magnet 14 for applying a magnetic field in a leftward or rightward direction in FIG. 2A to the magneto-optical crystal 10. The magnet 14 is opposed to an end portion of the magneto-optical crystal 10. According to the present construction, the Faraday rotation angle θ provided to a light beam by the magneto-optical crystal 10 gradually decreases as the distance from the portion of the magneto-optical crystal 10 which is opposed to the magnet 14 increases. This arises from the fact that the direction of local magnetization in the magneto-optical crystal 10 has such a distribution as indicated by arrow marks in FIG. 2A.

In the embodiment shown in FIG. 2B, the magnetic field application unit 12 includes a magnet 13 for applying a magnetic field in an upward or downward direction in FIG. 2B to the magneto-optical crystal 10, and two magnets 16 and 18 for applying magnetic fields in a leftward or rightward direction in FIG. 2B to the magneto-optical crystal 10. The magnet 16 is opposed to an end portion of the magneto-optical crystal 10 while the magnet 18 is opposed to the other end portion of the magneto-optical crystal 10. According to the present construction, the Faraday rotation angle $\theta$ exhibits a maximum value at positions at which the magneto-optical crystal 10 is opposed to the magnets 16 and 18 while the Faraday rotation angle $\theta$ exhibits a minimum value at a substantially central location of the magneto-optical crystal 10.

In the embodiment shown in FIG. 2C, the magnetic field application unit 12 includes a magnet 13 for applying a magnetic field in an upward or downward direction in FIG. 2C to the magneto-optical crystal 10, and three magnets 20, 22 and 24 for applying magnetic fields in a leftward or rightward direction in FIG. 2C to the magneto-optical crystal 10. The magnet 20 is opposed to an end portion of the magneto-optical crystal 10 while the magnet 24 is opposed to the other end portion of the magneto-optical crystal 10, and the magnet 22 is opposed to a substantially central location of the magneto-optical crystal 10. According to the present construction, the Faraday rotation angle $\theta$ exhibits a maximum value at the opposite end portions and the substantially central location of the magneto-optical crystal 10 while the Faraday rotation angle $\theta$ exhibits a minimum value at locations of ¼ and ¾ of the magneto-optical crystal 10 in the upward or downward direction in FIG. 2C.

By constructing each of the embodiments shown in FIGS. 2A to 2C such that the strength of magnetization of the magneto-optical crystal 10 is saturated by a magnetic field provided only by the magnet 13, then the curve which represents the relationship between the Faraday rotation angle $\theta$ and the position can be made a continuous curve and the reproducibility of the relationship can be improved.

Figure 3:
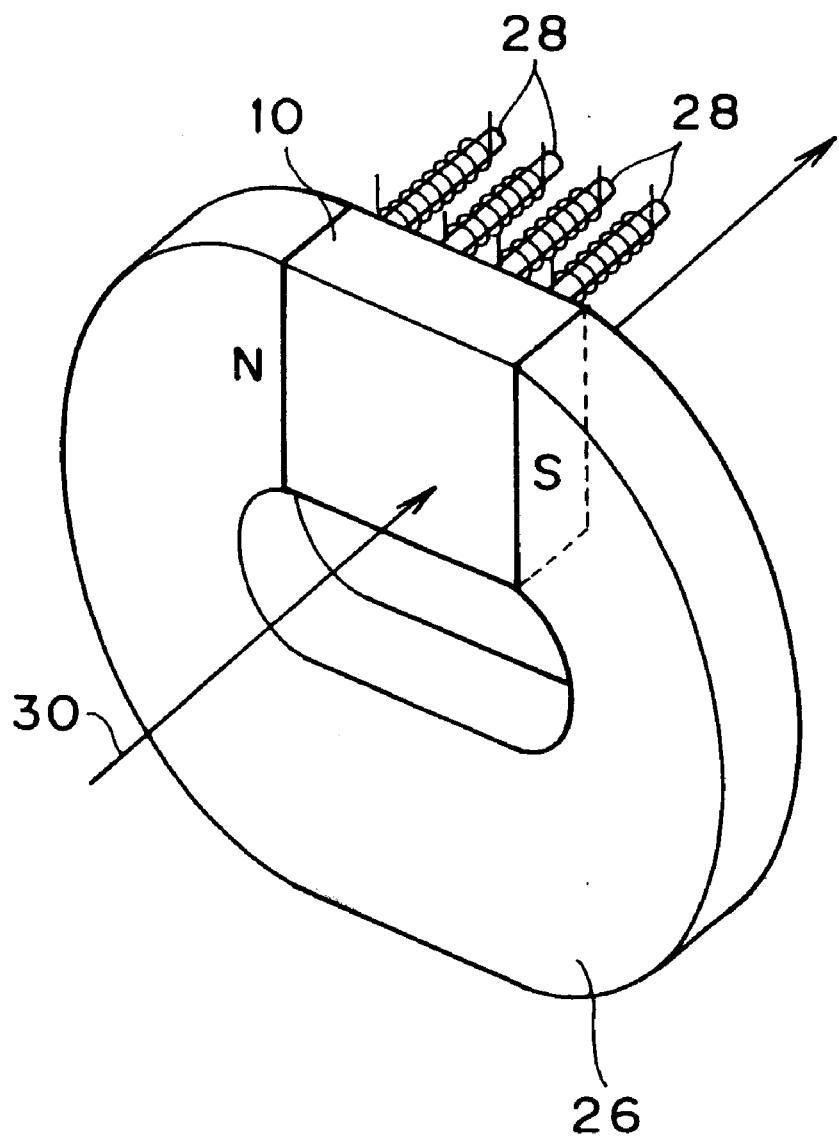
FIG. 3 is a perspective view showing another embodiment of a magnetic field application unit which can be applied to the present invention.

FIG. 3 is a perspective view showing another embodiment of the magnetic field application unit 12. Here, the magnetic field application unit 12 includes a single permanent magnet 26 and a plurality of electromagnets 28 for applying magnetic fields to the magneto-optical crystal 10. Reference numeral 30 denotes a propagation direction of an light beam which passes through the magneto-optical crystal 10. The direction of a magnetic field applied to the magneto-optical crystal 10 by the permanent magnet 26 is substantially perpendicular to the propagation direction 30 of the light beam, and the direction of a magnetic field applied to the magneto-optical crystal 10 by each of the electromagnets 28 is substantially parallel to the propagation direction 30 of the light beam.

According to the present construction, since a magnetic field can be applied effectively to the magneto-optical crystal 10 by the permanent magnet 26, the strength of magnetization of the magneto-optical crystal 10 can be saturated readily. Further, since the directions and strengths of magnetization at individual portions of the magneto-optical crystal 10 can be varied readily by turning on/or or adjusting the currents to be individually supplied to the electromagnets 28, the distribution of magnetization of the magneto-optical crystal 10 can be set readily and arbitrarily.

Figure 4:
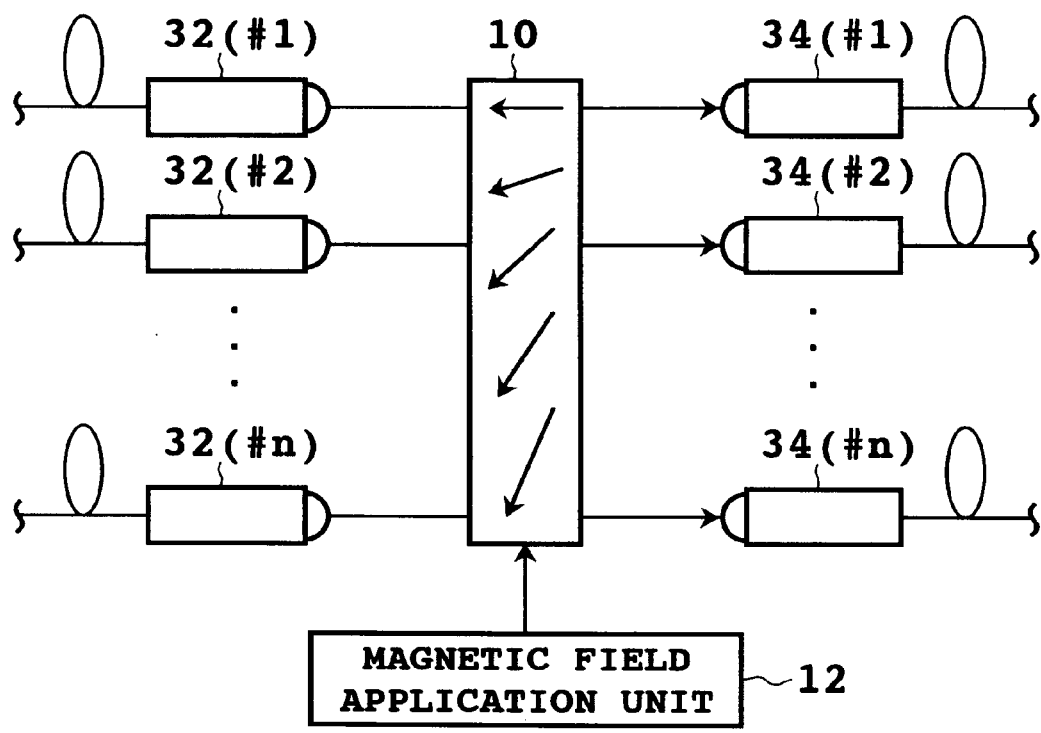
FIG. 4 is a block diagram showing another embodiment of a Faraday rotator according to the present invention.

FIG. 4 is a block diagram showing another embodiment of a Faraday rotator according to the present invention. The Faraday rotator shown includes a plurality of fiber collimators 32 (#1, . . . , #n), and a plurality of fiber collimators 34 (#1, . . . , #n) optically coupled to corresponding ones of the fiber collimators 32 (#1, . . . , #n) by parallel light beams. Each of the fiber collimators 32 (#1, . . . , #n) functions as the port 4 of FIG. 1, and each of the fiber collimators 34 (#1, . . . , #n) functions as the port 8 of FIG. 1. Each of the fiber collimators is composed, for example, of an optical fiber, a lens, and a sleeve for holding the optical fiber and the lens so that an end of the optical fiber and the lens may have a positional relationship determined in advance.

According to the present embodiment, by making the fiber collimators 32 (#1, . . . , #n) correspond to optical signals of different channels of WDM signal light and adopting, for example, the embodiment of FIG. 3 as the magnetic field application unit 12, an arbitrary Faraday rotation angle can be provided to each of the optical signals of the individual channels. Further, since the magneto-optical crystal 10 can be applied commonly to a plurality of channels, the apparatus construction can be simplified.

Figure 5:
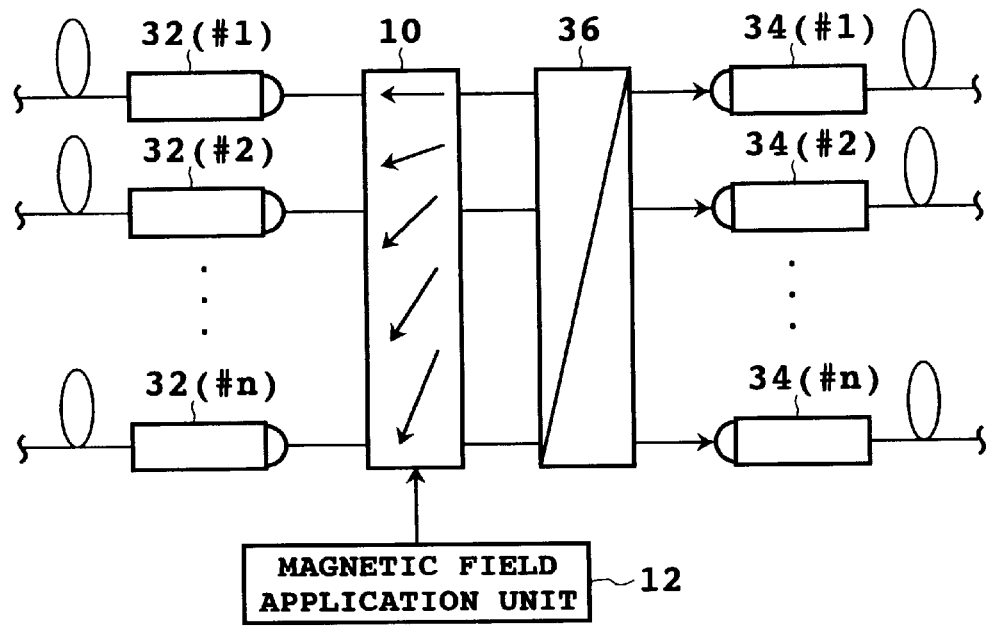
FIG. 5 is a block diagram showing a first embodiment of an optical attenuator according to the present invention.

FIG. 5 is a block diagram showing a first embodiment of an optical attenuator according to the present invention. The present optical attenuator is characterized, in contrast with the Faraday rotator shown in FIG. 4, in that it additionally includes a polarizer 36 provided so that light beams Faraday rotated by the magneto-optical crystal 10 may pass therethrough. The coupling efficiency between each of the fiber collimators 32 (#1, . . . , #n) and a corresponding one of the fiber collimators 34 (#1, . . . , #n), that is, the attenuation, is determined by the polarization plane of light which passes through the polarizer 36 and the polarization condition of each light beam Faraday rotated by the magneto-optical crystal 10. Accordingly, by applying the present optical attenuator to WDM, an arbitrary attenuation can be provided each of the optical signals of the channels.

Figure 6:
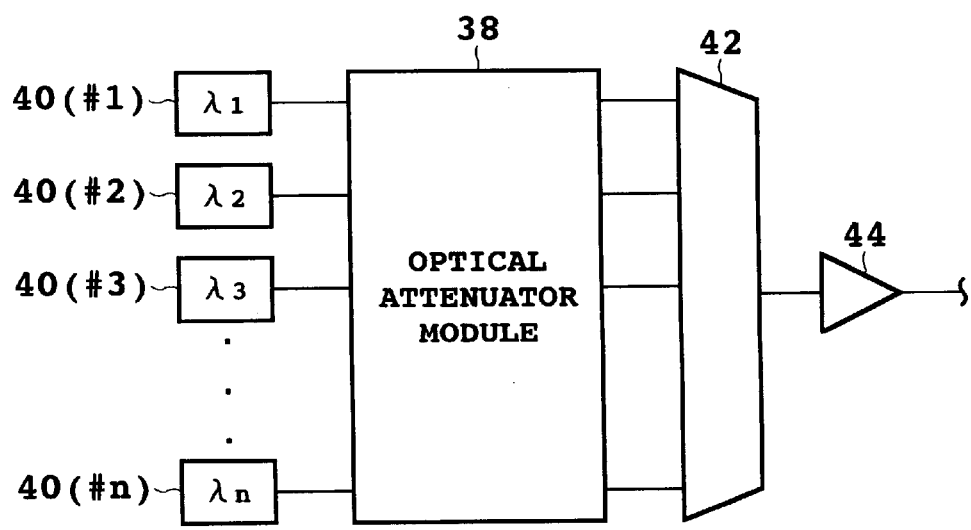
FIG. 6 is a block diagram showing a first embodiment of an optical transmitter for WDM according to the present invention.

FIG. 6 is a block diagram showing a first embodiment of an optical transmitter for WDM according to the present invention. Here, an optical attenuator module 38 which corresponds to the first embodiment of the optical attenuator shown in FIG. 5 is used. Light sources 40 (#1, . . . , #n) are optically connected to the fiber collimators 32 (#1, . . . , #n) of the optical attenuator module 38, respectively. The light sources 40 (#1, . . . , #n) output optical signals of wavelengths $\lambda 1, \ldots, \lambda n$, respectively. As the modulation to obtain the optical signals, direct modulation for each light source or indirect modulation wherein an external optical modulator is used can be applied. Optical signals outputted from the light sources 40 (#1, . . . , #n) are subject to, for example, different attenuations in accordance with the principle described hereinabove by the optical attenuator module 38, and the plurality of optical signals thus attenuated are wavelength division multiplexed by an optical multiplexer 42. WDM signal light obtained as a result of the wavelength division multiplexing is amplified by an optical amplifier 44 and forwarded into an optical fiber transmission line not shown.

Where the wavelengths of the WDM signal light are included in the 1.55 $\mu$m band (1.50 to 1.60 $\mu$m), an erbium-domed fiber amplifier (EDFA) can be adopted as the optical amplifier 44. The EDFA includes an erbium-domed fiber (EDF) doped with erbium, a pump light source for outputting pump light, and an optical circuit for supplying the pump light and WDM signal light to be amplified to the EDF. The wavelength of the pump light is included, for example, in the 0.98 $\mu$m band (0.97 to 0.99 $\mu$m) or the 1.48 $\mu$m band (1.47 to 1.49 $\mu$m).

Figure 7:
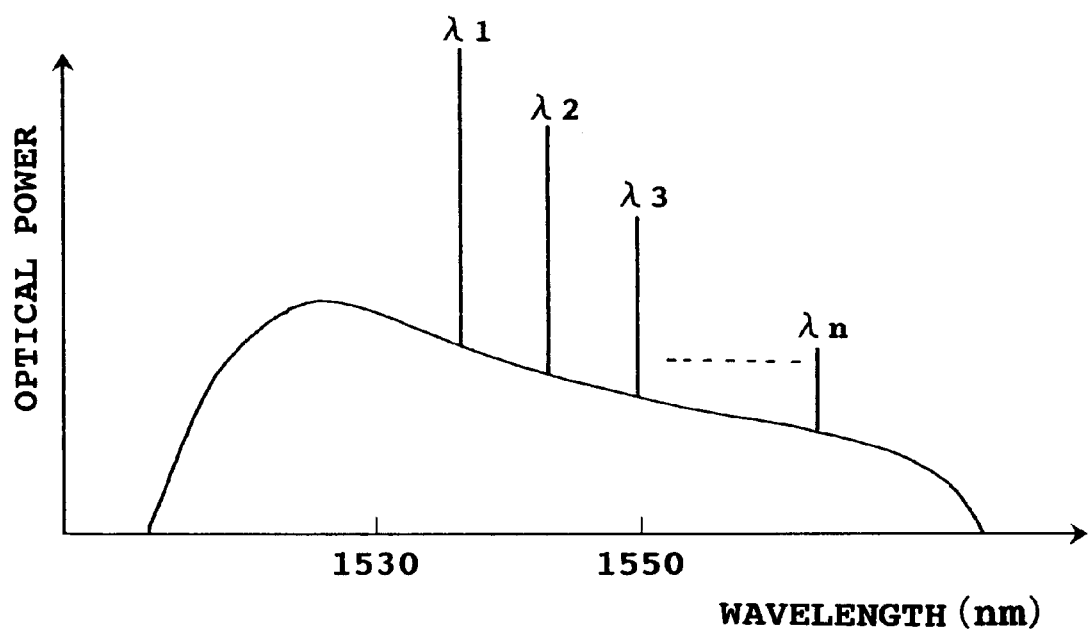
FIG. 7 is a diagram illustrating an example of a wavelength characteristic of the gain of an optical amplifier.

FIG. 7 is a diagram illustrating an example of a wavelength characteristic of an optical amplifier. The axis of ordinate indicates the optical power while the axis of abscissa indicates the wavelength, and a spectrum of WDM signal light amplified by an EDFA is illustrated in FIG. 7. This spectrum has a shape wherein steep spectra of optical signals of different channels are superposed on a comparatively moderate spectrum of ASE (amplified spontaneous emission) generated in an EDFA. It is known that, in an EDFA, a comparatively simple gain tilt appears in the proximity of the wavelength 1,550 nm, and this gain tilt is reflected on the shape of a spectrum of ASE. Here, a gain tilt along which the gain decreases as the wavelength increases is shown. Due to the presence of such a gain tilt as just described, even if, for example, the powers of optical signals outputted from the light sources 40 (#1, . . . , #n) of FIG. 6 and the losses at connection locations of them are equal to each other, the powers of the optical signals are different individually among the channels in accordance with the gain tilt as seen from FIG. 7.

An optical attenuator according to the present invention is very effective to cope with such a gain tilt as described above. In particular, in order to compensate for a comparatively simple gain tilt, since the distribution of magnetization of the magneto-optical crystal 10 can be set readily, by applying the present invention to the optical attenuator module 38 of FIG. 6, the level deviation between channels of amplified WDM signal light outputted from an optical transmitter for WDM can be reduced effectively.

Figure 8:
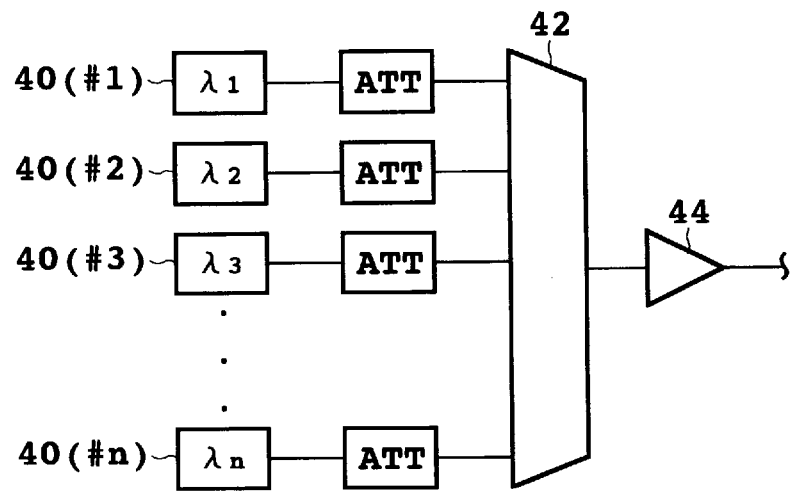
FIG. 8 is a block diagram showing a prior art of an optical transmitter for WDM.

Referring to FIG. 8, there is shown a prior art of an optical transmitter for WDM. Here, a plurality of optical attenuators (ATTs) are shown in place of the optical attenuator module 38 of FIG. 6 to which the present invention is applied. Although, also with the prior art, the level deviation between channels of amplified WDM signal light can be reduced by suitably setting the attenuation of each of the optical attenuators, since a number of optical attenuators equal to the number of channels are required, the apparatus construction is complicated.

In contrast, where the present invention is applied, for example, in the embodiment of FIG. 6, since the optical attenuator module 38 can be applied commonly to a plurality of channels of WDM, the apparatus construction is simplified.

Figure 9:
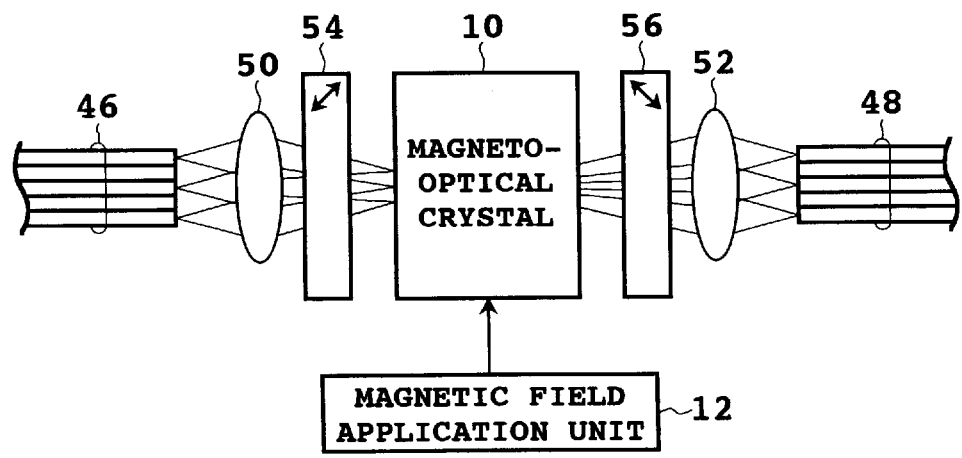
FIG. 9 is a block diagram showing a second embodiment of an optical attenuator according to the present invention.

FIG. 9 is a block diagram showing a second embodiment of an optical attenuator according to the present invention. In order to make it possible to use the present optical attenuator as the optical attenuator module 38 of FIG. 6, a first optical fiber array 46 and a second optical fiber array 48 are provided. Each optical fiber of the first optical fiber array 46 functions as the port 4 of FIG. 1 while each optical fiber of the second optical fiber array 48 functions as the port 8 of FIG. 1. In order to optically couple the optical fibers of the first optical fiber array 46 and the optical fibers of the second optical fiber array 48 to each other by converged light beams, a lens 50 which is opposed to the first optical fiber array 46 and another lens 52 which is opposed to the second optical fiber array 48 are provided.

The magneto-optical crystal 10 and the magnetic field application unit 12 are provided similarly as in the optical attenuator described hereinabove. The magneto-optical crystal 10 is provided such that the light beams may pass therethrough.

First double refraction crystal 54 is interposed between the lens 50 and the magneto-optical crystal 10 while second double refraction crystal 56 is interposed between the magneto-optical crystal 10 and the lens 52. Each of the double refraction crystal 54 and 56 is in the form of a flat plate made of a double refraction substance such as rutile and has an optical axis which is inclined approximately by 45 degrees with respect to the light beams as indicated by a double-sided arrow mark in FIG. 9. The first double refraction crystal 54 couples the light beams to ordinary light components and extraordinary ray components. The second double refraction crystal 56 couples the ordinary light components and the extraordinary ray components to light beams.

For each of the double refraction crystal 54 and 56, a wedge plate made of a double refraction substance may be used alternatively (this similarly applies to the following description). In this instance, the lens 50 and 52 are selected so that not converted light beams but parallel light beams may be obtained thereby.

FIG. 10 is a diagrammatic view illustrating a principle of operation of the optical attenuator shown in FIG. 9. Reference numeral 58 denotes a certain optical fiber of the optical fiber array 46, and reference numeral 60 denotes an optical fiber of the optical fiber array 48 coupled to the optical fiber 58. Operation of the optical attenuator of FIG. 9 can be understood from a situation of optical coupling between the optical fibers 58 and 60.

Light emitted from an end 58A of the optical fiber 58 is changed into a beam 62 by the lens 50. The beam 62 is separated into beams 64 and 66, which correspond to an ordinary ray and an extraordinary ray of the beam 62, respectively, by the first double refraction crystal 54. The beams 64 and 66 travel in parallel to each other and are outputted from positions of the double refraction crystal 54 a little different from each other. The beams 64 and 66 are provided with substantially equal Faraday rotation angles by the magneto-optical crystal 10 and outputted as beams 68 and 70, respectively. The beam 68 is separated into beams 72 and 74, which correspond to an ordinary ray and an extraordinary ray of the beam 68, respectively, by the double refraction crystal 56. The beam 70 is separated into beams 76 and 78, which correspond to an ordinary ray and an extraordinary ray of the beam 70, respectively, by the double refraction crystal 56.

If it is assumed that the double refraction crystal 54 and 56 lie in parallel to each other and have an equal thickness, then the beams 72 and 78 are overlapped with each other. Accordingly, the beams 72 and 78 are converged by the lens 52 and can be coupled to an end 60A of the optical fiber 60. The beams 74 and 76 turn away from the beams 72 and 78 and are removed.

The ratio (that is, attenuation) of the total power of the beams 72 and 78 to the power of the input beam relies upon the Faraday rotation angle by the magneto-optical crystal 10. This Faraday rotation angle depends upon the distribution of magnetization of the magneto-optical crystal 10 by the magnetic field application unit 12 and the positions of the beams 64 and 66. Accordingly, by using the optical attenuator of FIG. 9 as the optical attenuator module 38 of FIG. 6, an arbitrary attenuation can be provided to each of optical signals of different channels in WDM. Further, if the Faraday rotation angle provided by the magneto-optical crystal 10 is equal, then the total power of the beams 72 and 78 does not rely upon the polarization condition of an input beam. Accordingly, irrespective of the polarization condition of each of optical signals of individual channels, a desired attenuation can be provided to the optical signal.

In this manner, according to the embodiment of FIG. 9, provision of the optical attenuator module 38 (refer to FIG. 6) which does not rely upon polarization is possible.

While operation of the embodiment of FIG. 9 when light advances in a direction from the optical fiber array 46 toward the optical fiber array 48 is described above, naturally the embodiment of FIG. 9 operates similarly also when light advances in the opposite direction from the optical fiber array 48 toward the optical fiber array 46.

FIG. 11 is a block diagram showing a third embodiment of an optical attenuator according to the present invention. Here, in order to add the function of the optical multiplexer 42 to the function of the optical attenuator module 38 of FIG. 6, one port and a plurality of ports are coupled to each other. To this end, a single optical fiber 80 is provided in place of the first optical fiber array 46 of FIG. 9, and a dispersing element 82 is interposed between the lens 50 and the first double refraction crystal 54. The dispersing element 82 couples the optical fiber 80 to a plurality of light beams having different wavelengths. Since coupling between each of the plurality of light beams and a corresponding one of optical fibers of the optical fiber array 48 where an attenuation is involved can be understood based on the principle of operation of FIG. 10, overlapping description of it is omitted here.

Figure 12A:
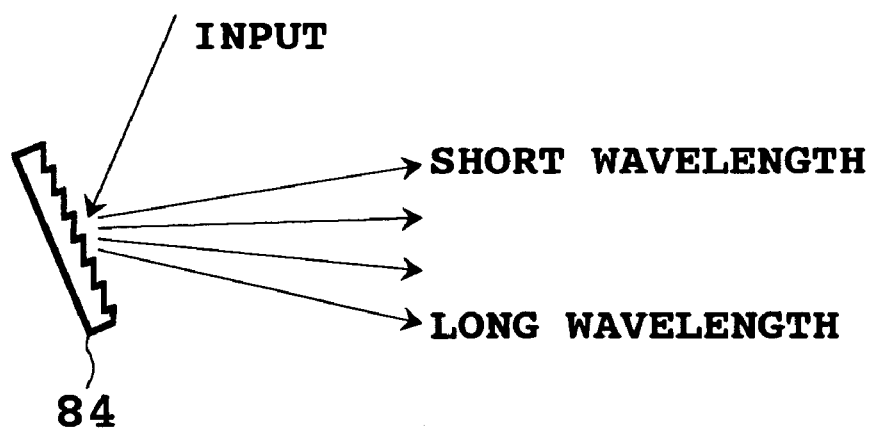
FIGS. 12A and 12B are diagrammatic views showing embodiments of a dispersing element which can be applied to the present invention.
Figure 12B:
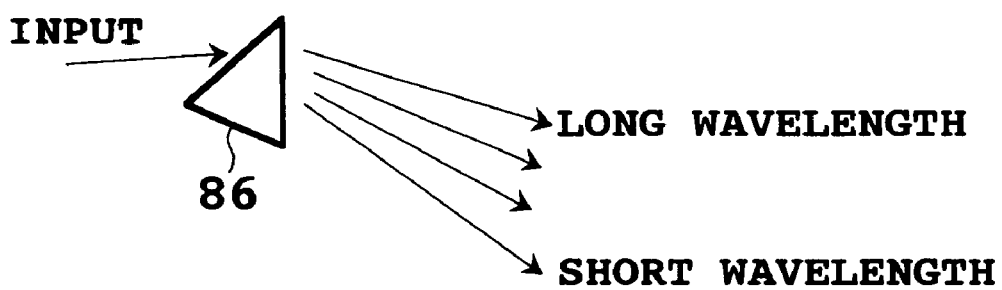

Referring to FIGS. 12A and 12B, there are shown embodiments of a dispersing element which can be used as the dispersing element 82 of FIG. 11. The dispersing element shown in FIG. 12A is a grating 84 of the reflection type. The grating 84 diffracts an input beam provided by WDM signal light at different angles for the individual wavelengths of optical signals. More particularly, the angle defined by an optical signal of a comparatively short wavelength and the input beam is smaller than the angle defined by another optical signal of a comparatively long wavelength and the input beam. The dispersing element shown in FIG. 12B is a prism 86. The prism 86 refracts an input beam provided by WDM signal light at reffraction angles different for the individual wave-lengths of optical signals. More particularly, the refraction angle of an optical signal of a comparatively short wavelength is larger than the refraction angle of an other optical signal of a comparatively long wavelength.

Since a light beam can be separated spatially in accordance with the wavelengths using a dispersing element in this manner, different attenuations can be provided to the light beam in accordance with wavelengths by setting the distribution of magnetization of the magneto-optical crystal 10 in accordance with the present invention.

It is to be noted that, while, in FIG. 11, arrow marks indicative of the propagation directions of light beams are directed from the optical fiber 80 toward the second optical fiber array 48, the optical attenuator of FIG. 11 operates reversibly in a similar manner to the embodiment of FIG. 9.

Figure 13:
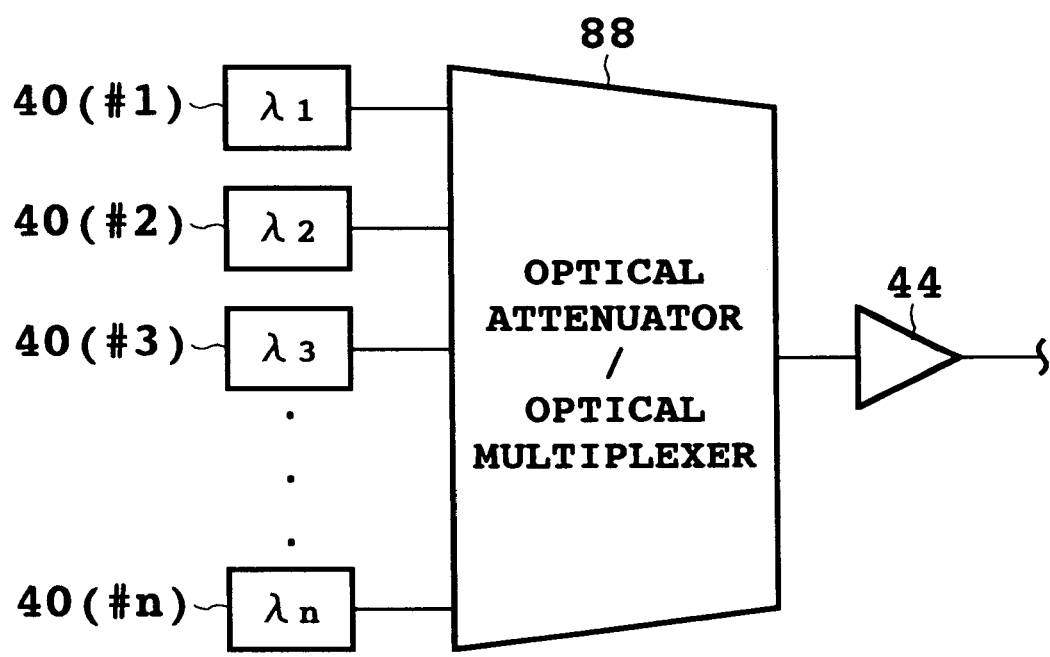
FIG. 13 is a block diagram showing a second embodiment of an optical transmitter for WDM according to the present invention.

FIG. 13 is a block diagram showing a second embodiment of an optical transmitter for WDM according to the present invention. Here, the optical attenuator shown in FIG. 11 is used as an optical attenuator/optical multiplexer module 88, and the optical fiber array 48 is optically connected to the light sources 40 (#1, . . . , #n) while the optical fiber 80 is optically connected to the optical amplifier 44. According to the present embodiment, since the functions of the optical attenuator module 38 and the optical multiplexer 42 shown in FIG. 6 can be performed only by the optical attenuator shown in FIG. 11, the construction of the optical transmitter for WDM can be simplified.

Figure 14:
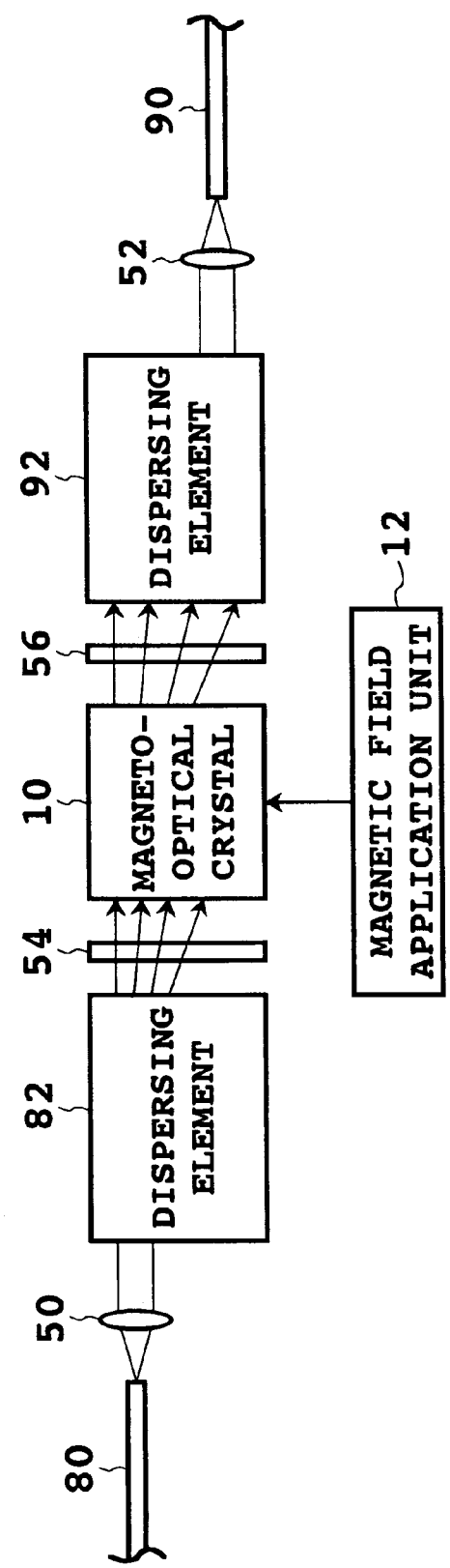
FIG. 14 is a block diagram showing a fourth embodiment of an optical attenuator according to the present invention.

FIG. 14 is a block diagram showing a fourth embodiment of an optical attenuator according to the present invention. Here, in order to couple one port and another one port by a plurality of light beams of different wavelengths which pass through the magneto-optical crystal 10, a single optical fiber 90 is used in place of the optical fiber array 48 of FIG. 11. Further, in order to couple a plurality of light beams provided by the dispersing element 82 to the optical fiber 90, another dispersing element 92 is interposed between the double refraction crystal 56 and the lens 52. Since an attenuation which is provided to each of the plurality of light beams can be understood based on the principle of operation of FIG. 10, overlapping description of it is omitted here.

In order to suppress the coupling loss between the optical fiber 80 and the optical fiber 90 low, a dispersing element same as the dispersing element 82 is preferably used as the dispersing element 92.

It is to be noted that, while, in FIG. 14, arrow marks indicative of propagation directions of individual light beams are directed from the optical fiber 80 toward the optical fiber 90, the optical attenuator shown in FIG. 14 operates reversibly similarly to the embodiment of FIG. 11.

Figure 15:
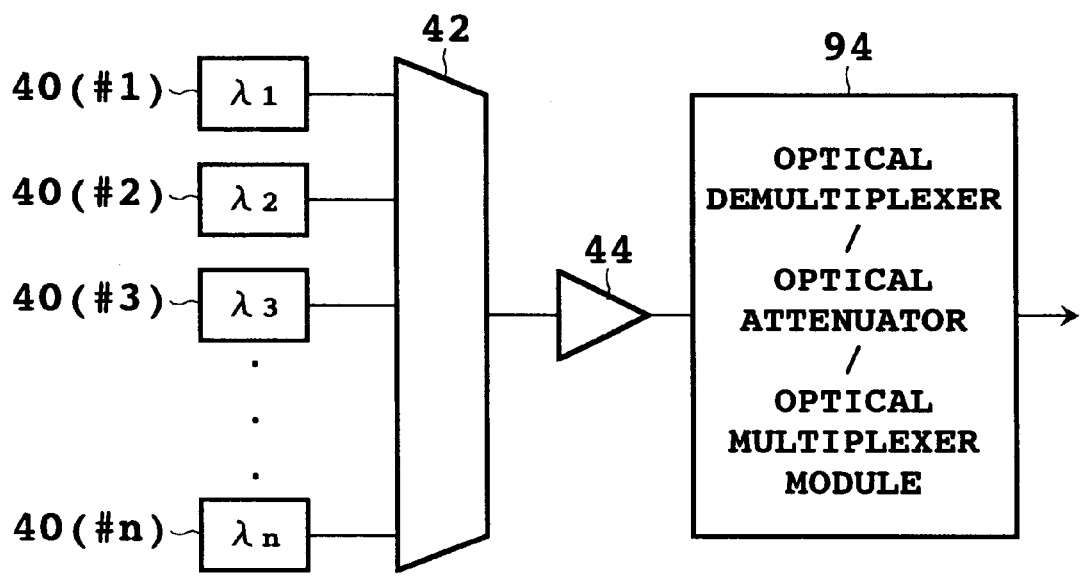
FIG. 15 is a block diagram showing a third embodiment of an optical transmitter for WDM according to the present invention.

FIG. 15 is a block diagram showing a third embodiment of an optical transmitter for WDM according to the present invention. Here, the optical attenuator shown in FIG. 14 is used as an optical demultiplexer/optical attenuator/optical multiplexer module 94. Optical signals outputted from the light sources 40 (#1, . . . , #n) are wavelength division multiplexed directly by the optical multiplexer 42, and resulting WDM signal light is amplified by the optical amplifier 44. The amplified WDM signal light passes through the module 94 and is sent out into an optical fiber transmission line not shown. In the module 94, to each of optical signals of the individual channels of the WDM signal light, an attenuation corresponding to a position at which the optical signal passes through the magneto-optical crystal 10 is provided. Accordingly, by suitably setting the distribution of magnetization of the magneto-optical crystal 10 in accordance with the present invention, a desired attenuation can be provided to each optical signal. Accordingly, the module 94 functions as an optical equalizer.

While, in the embodiment of FIG. 15, WDM signal light amplified by the optical amplifier 44 is supplied to the module 94, the order in connection of the module 94 and the optical amplifier 44 may be reversed so that WDM signal light may be amplified by the optical amplifier 44 after a desired attenuation is provided to each of the optical signals of the WDM signal light.

While, in the embodiment of FIG. 15, the module 94 is provided in the optical transmitter for WDM, the module 94 may alternatively be provided intermediately of the optical fiber transmission line so as to suppress the level deviation between channels in WDM integrated as a result of use of a plurality of linear optical repeaters each including an optical amplifier.

In this manner, by using the two dispersing elements 82 and 92 as seen in FIG. 14, the functions of an optical demultiplexer and an optical multiplexer can be obtained in addition to the function of an optical attenuator according to the present invention.

Figure 16:
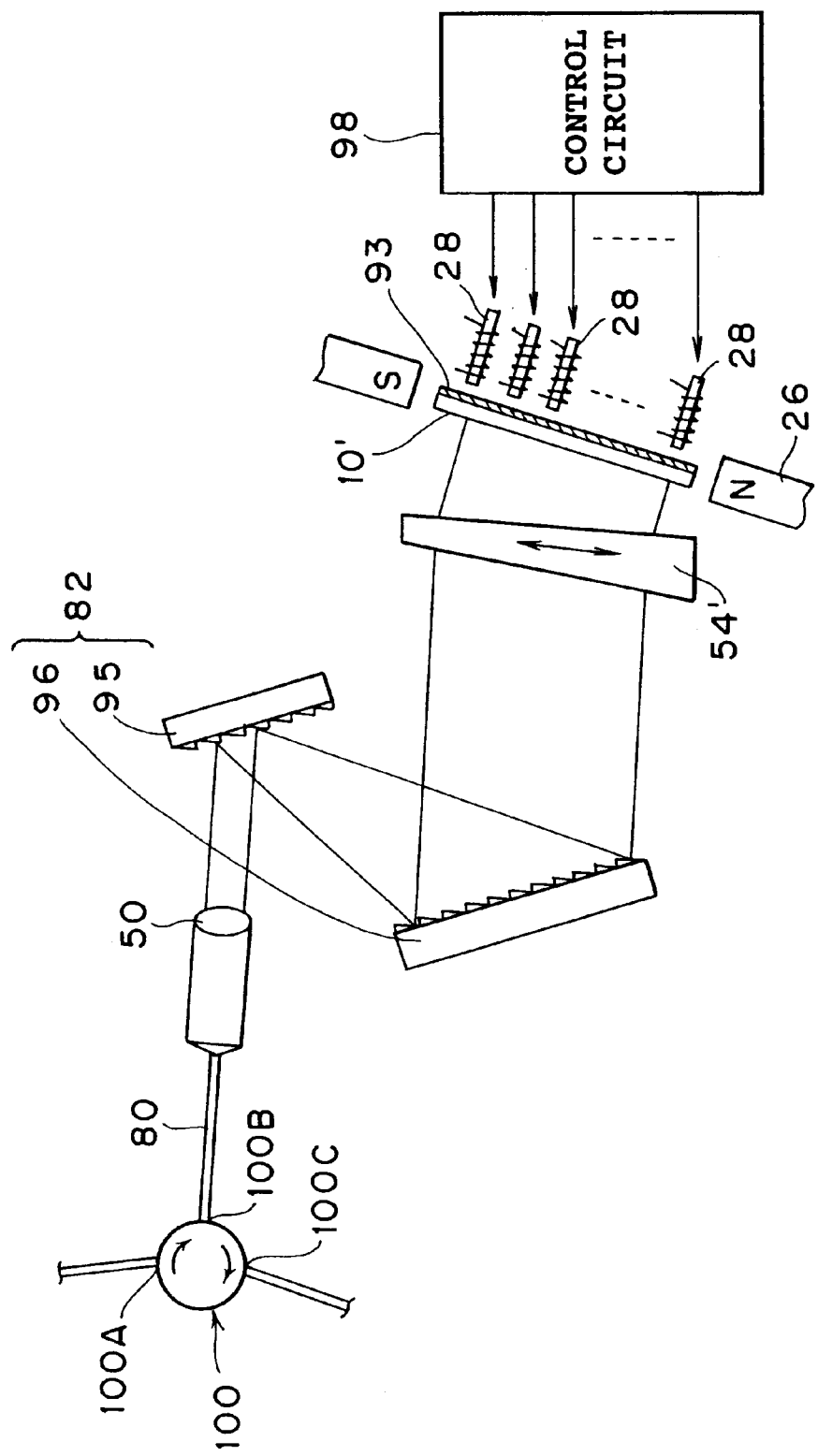
FIG. 16 is a block diagram showing a fifth embodiment of an optical attenuator according to the present invention.

FIG. 16 is a block diagram showing a fifth embodiment of an optical attenuator according to the present invention. Here, taking it into consideration that principal components of the optical attenuator of FIG. 14 are geometrically symmetrical with respect to a plane at the center of the magneto-optical crystal 10, a mirror 93 is provided on one face of a magneto-optical crystal 10' while the double refraction crystal 56, dispersing element 92, lens 52 and optical fiber 90 of FIG. 14 are omitted.

As the dispersing element 82, a pair of reflection type gratings 95 and 96 having an equal grating constant are used so that, where an input beam to the dispersing element 82 is a parallel beam, also an output beam may be a parallel beam. Further, in order to secure conformity with a parallel beam, a wedge plate made of a double refraction substance such as rutile is used as double refraction crystal 54'. In order to spatially separate WDM signal light supplied to the optical fiber 80 and WDM signal light outputted from the optical fiber 80 and having desired attenuations provided to optical signals of individual signals, an optical circulator 100 is used. The optical circulator 100 has three ports 100A, 100B and 100C and functions such that light supplied to the port 100A is outputted from the port 100B whereas light supplied to the port 100B is outputted from the port 100C. As the magnetic field application unit 12, the magnetic field application unit shown in FIG. 3 is adopted. To each of the electromagnets 28, driving current controlled by a control circuit 98 is supplied.

According to the present embodiment, since the thickness of the magneto-optical crystal 10' may be reduced to substantially one half the thickness of the embodiment magneto-optical crystal 10 of FIG. 14, the used amount of magneto-optical crystal which is expensive can be reduced to achieve reduction in cost. Further, since the number of parts can be reduced, further reduction in cost can be achieved. Furthermore, since the mirror 93 is provided on one face of the magneto-optical crystal 10' so that a light beam may be reflected by the mirror 93 and reciprocate in the magneto-optical crystal 10', the degree of freedom in form of arrangement of the electromagnets 28 for applying magnetic fields in the same direction as those of the beams is increased.

As described above, according to the present invention, an effect is achieved that provision of an optical device of a simple construction by which an arbitrary Faraday rotation angle or an arbitrary attenuation can be provided to each of optical signals of different channels in wavelength division multiplexing (WDM).

The invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device, comprising:
   a first port positioned in a first region;
   a second port optically coupled to said first port by a light beam and positioned in a second region;
   a magneto-optical crystal provided such that the light beam may pass therethrough; and
   means for applying a magnetic field to said magneto-optical crystal so that magnetization of said magneto-optical crystal may have a given non-uniform distribution in a plane substantially perpendicular to the light beam.

2. An optical device according to claim 1, wherein
   said means for applying includes a plurality of magnets, and
   said plurality of magnets include at least one electromagnet for generating a variable magnetic field.

3. An optical device according to claim 1, wherein
   said means for applying includes means for saturating the strength of magnetization of said magneto-optical crystal, and means for providing a variation to the direction and the strength of the magnetization.

4. An optical device according to claim 1, wherein
   said means for applying includes means for varying the given non-uniform distribution.

5. An optical device according to claim 1, wherein
   the light beam having passed through said magneto-optical crystal is Faraday rotated by a rotation angle determined by the passing position of the light beam with respect to the magneto-optical crystal and the given non-uniform distribution.

6. An optical device according to claim 5, further comprising
   a polarizer provided such that the Faraday rotated light beam may pass therethrough.

7. An optical device according to claim 1, wherein
   said first port is provided by a first plurality of optical fibers while
   said second port is provided by a second plurality of optical fibers, and
   each of said first plurality of optical fibers is optically coupled to a corresponding one of said second plurality of optical fibers.

8. An optical device, comprising:
   a first plurality of optical fibers positioned in a first region;
   a second plurality of optical fibers each optically coupled to a corresponding one of said first plurality of optical fibers by a light beam and positioned in a second region;
   a magneto-optical crystal provided such that the light beams coupling the first and second optical fibers may pass therethrough;
   a device to apply a magnetic field to said magneto-optical crystal so that magnetization of said magneto-optical crystal may have a given non-uniform distribution in a plane substantially perpendicular to the light beam;
   a first birefringent crystal interposed between said first plurality of optical fibers and said magneto-optical crystal for coupling the light beams to ordinary ray components and extraordinary ray components; and
   a second birefringent crystal interposed between said magneto-optical crystal and said second plurality of optical fibers for coupling the ordinary ray components and the extraordinary ray components to the light beams.

9. An optical device according to claim 8, further comprising:
   a plurality of light sources individually optically connected to said first plurality of optical fibers for outputting a plurality of optical signals having different wavelengths from each other; and
   an optical multiplexer optically connected to said second plurality of optical fibers for wavelength division multiplexing the plurality of optical signals and outputting wavelength division multiplexed (WDM) signal light.

10. An optical device according to claim 9, further comprising:
    an optical amplifier optically connected to said optical multiplexer for amplifying the WDM signal light.

11. An optical device according to claim 8, wherein
    said device to apply includes a plurality of magnets, and
    said plurality of magnets include at least one electromagnet for generating a variable magnetic field.

12. An optical device according to claim 8, wherein
    said device to apply includes a device to saturate the strength of magnetization of said magneto-optical crystal, and a device to provide a variation to the direction and the strength of the magnetization.

13. An optical device according to claim 8, wherein said device to apply includes a device to vary the given non-uniform distribution.

14. An optical device, comprising:

a single optical fiber;

a dispersing element for coupling said optical fiber to a plurality of light beams having different wavelengths from each other;

a plurality of optical fibers to which the plurality of light beams are coupled;

a magneto-optical crystal provided such that the plurality of light beams may pass therethrough;

a device to apply a magnetic field to said magneto-optical crystal so that magnetization of said magneto-optical crystal may have a given non-uniform distribution in a plane substantially perpendicular to the plurality of light beams;

a first birefringent crystal interposed between said dispersing element and said magneto-optical crystal for coupling the light beams to ordinary ray components and extraordinary ray components; and a second birefringent crystal interposed betweens aid magneto-optical crystal and said plurality of optical fibers for coupling the ordinary ray components and the extraordinary ray components to the light beams.

15. An optical device according to claim 14, further comprising a plurality of light sources individually optically connected to said plurality of optical fibers for outputting a plurality of optical signals having different wavelengths from each other, the plurality of optical signals being wavelength division multiplexed by said optical device so as to be outputted as wavelength division multiplexed (WDM) signal light from said single optical fiber.

16. An optical device according to claim 15, further comprising:

an optical amplifier optically connected to said single optical fiber for amplifying the WDM signal light.

17. An optical device according to claim 14, wherein said device to apply includes a plurality of magnets, and said plurality of magnets include at least one electromagnet for generating a variable magnetic field.

18. An optical device according to claim 14, wherein said device to apply includes a device to saturate the strength of magnetization of said magneto-optical crystal, and a device to provide a variation to the direction and the strength of the magnetization.

19. An optical device according to claim 14, wherein said device to apply includes a device to vary the given non-uniform distribution.

20. An optical device, comprising:

a first optical fiber;

a first dispersing element for coupling said first optical fiber to a plurality of light beams having different wavelengths from each other;

a second optical fiber;

a second dispersing element for coupling the plurality of light beams to said second optical fiber;

a magneto-optical crystal provided such that the plurality of light beams may pass therethrough;

a device to apply a magnetic field to said magneto-optical crystal so that magnetization of said magneto-optical crystal may have a given non-uniform distribution in a plane substantially perpendicular to the plurality of light beams;

a first birefringent crystal interposed between said first dispersing element and said magneto-optical crystal for coupling the light beams to ordinary ray components and extraordinary ray components; and a second birefringent crystal interposed between said magneto-optical crystal and said second dispersing element for coupling the ordinary ray components and the extraordinary ray components to the light beams.

21. An optical device according to claim 20, further comprising:

a plurality of light sources for outputting a plurality of optical signals having different wavelengths from each other; and an optical multiplexer optically connected to said plurality of light sources for wavelength division multiplexing the plurality of optical signals and outputting wavelength division multiplexed (WDM) signal light;

the WDM signal light being supplied to said first optical fiber.

22. An optical device according to claim 21, further comprising an optical amplifier for amplifying the WDM signal light.

23. An optical device according to claim 20, wherein said device to apply includes a plurality of magnets, and said plurality of magnets include at least one electromagnet for generating a variable magnetic field.

24. An optical device according to claim 20, wherein said device to apply includes a device to saturate the strength of magnetization of said magneto-optical crystal, and a device to provide a variation to the direction and the strength of the magnetization.

25. An optical device according to claim 20, wherein said device to apply includes a device to vary the given non-uniform distribution.

* * * * *